United States Patent [19]

Rees et al.

[11] Patent Number: 5,568,320
[45] Date of Patent: Oct. 22, 1996

[54] MULTIPLE ROW LENS ARRAY ALIGNABLE WITH MULTIPLE ROW IMAGE BAR

[75] Inventors: James D. Rees, Pittsford; Walter F. Leising, Webster, both of N.Y.

[73] Assignee: Xerox Corporation, Stamford, Conn.

[21] Appl. No.: 351,101

[22] Filed: Nov. 30, 1994

[51] Int. Cl.$^6$ ..................................... G02B 3/00
[52] U.S. Cl. ..................... 359/652; 385/119; 359/653
[58] Field of Search ............................ 359/652; 385/119, 385/120, 34, 115, 116, 124

[56] References Cited

U.S. PATENT DOCUMENTS

| | | | |
|---|---|---|---|
| 4,447,126 | 5/1984 | Heidrich .................................. | 359/652 |
| 4,888,603 | 12/1989 | Hart et al. .............................. | 346/160 |
| 5,033,814 | 7/1991 | Brown et al. ........................... | 385/119 |
| 5,237,347 | 8/1993 | Teshigawara et al. .................. | 346/160 |
| 5,260,718 | 11/1993 | Rommelmann ......................... | 346/107 R |
| 5,450,157 | 9/1995 | Rees ....................................... | 359/652 |

OTHER PUBLICATIONS

Lama, "Optical Properties of GRIN Fiber Lens Arrays: Dependence on Fiber Length," Applied Optics, vol. 21, No. 15, pp. 2739–2746, Aug. 1982.
Rees, "Method to Laterally Align a SELFOC Lens Array in an LED Printbar," 1991 Technical Digest, Series vol. 9, pp. 6–9.
NSG America, Inc. Price List, Apr. 1, 1994.
NSG America, Inc., "SELFOC Product Guide".
NSG America, Inc. "PD Module brochure".
NSG America, Inc. "Laser Diode Emitter Module Series LM" brochure.
NSG America, Inc. "Step Index Large Core EPF Optical Fiber" brochure.
IOT Integrierte Optik GmbH "Wideband Singlemode 1xN Splitter" brochure.
NSG America, Inc. "Planar Microlens Array (PML) Preliminary Specifications" brochure.
NSG America, Inc. "SELFOC Lens Array (SLA) Reference Book".
Rees, "Office applications of Gradient–Index Optics", SPIE vol. 935, Gradient–Index Optics and Miniature Optics, 1988, pp. 27–51.
Rees, "Non–Gaussian Imaging Properties of GRIN Fiber Lens Arrays", Applied Optics, vol. 21, No. 6, pp. 1009–1012, Mar. 1982.
Rees et al. "Some Radiometric Properties of Gradient–Index Fiber Lenses," Applied Optics, vol. 19, No. 7, pp. 1065–1069, Apr. 1980.
Smith, Modern Optical Engineering: The Design of Optical Systems, pp. 124–125.

*Primary Examiner*—Georgia Y. Epps
*Assistant Examiner*—Jordan M. Schwartz
*Attorney, Agent, or Firm*—Finnegan, Henderson, Farabow, Garrett & Dunner

[57] ABSTRACT

In an optical system, a lens array comprises a plurality of gradient index lenses arranged in a plurality of rows. The lens array is aligned with an image bar having a plurality of pixel rows in such a manner that each pixel row in the image bar is symmetrically arranged with respect to lens rows having fields of view encompassing the pixel row.

4 Claims, 6 Drawing Sheets

MULTIPLE ROW LENS ARRAY ALIGNABLE WITH MULTIPLE ROW IMAGE BAR

BACKGROUND OF THE INVENTION

1. Field of the Invention

The present invention generally relates to lens arrays. More particularly, the present invention relates to multiple row lens arrays aligned with multiple row linear image bars.

2. Description of the Related Art

Many presently available imaging systems, such as printers, copiers, and scanners, employ gradient index lens arrays to image light. One manufacturer, Nippon Sheet Glass Company, Ltd., produces these lens arrays under the trade name "SELFOC," a registered mark in Japan. These lens arrays are generally discussed in an article entitled "Office applications of gradient-index optics," by James D. Rees, published in SPIE, Vol. 935, Gradient-Index Optics and Miniature Optics, in 1988, the contents of which are hereby incorporated by reference.

A gradient index lens array usually comprises an array of light conducting and imaging fibers or rods possessing a refractive index distribution across their cross-sections that varies parabolically in an outward direction from their center axes. Typically, these fibers are cylindrical.

FIG. 1 shows an example of a conventional two-row gradient index lens array 100. As shown in FIG. 1, optical fibers are arranged side-by-side in two parallel rows in a direction orthogonal to their mechanical axes, which are preferably also their optical axes. Also, the fibers in the lens array 100 are "close packed"; that is, the fibers are positioned with little or no space therebetween. For example, the rows are arranged in an interlocking fashion (e.g., staggered with respect to each other with little or no space between the rows), so that the fibers in one row "fit" in gaps created by adjacent fibers in the other row.

The lens arrays are typically used with image bars, such as LED or liquid crystal arrays, to form images. FIG. 2 shows an example of a conventional LED printer imaging system employing a two-row lens array. Here, an LED (light emitting diode) array 200 made up of a single row of LEDs is arranged above a two-row lens array 210. LEDs in LED array 200 are activated in accordance with image data from, for example, a digital signal source. Light from the LED array 200 enters the top of the lens array 210. Lens array 210 images the light onto a photoreceptor 220.

Due to the irradiance profile that is characteristic of gradient index lenses, it is essential that lens arrays and LED arrays are properly aligned with respect to each other; that is, that the LED row is symmetrically arranged with respect to the lens rows. Otherwise, images will contain undesirable "banding." Typically, banding appears in images as extraneous lines positioned at a spatial frequency, such as one cycle/mm, which is discernible to the human eye. Alignment of such lens arrays and LED arrays is discussed in an article entitled "Method to Laterally Align a SELFOC Lens Array in an LED Printbar," by James D. Rees, *Gradient-Index Optical Systems*, 1991 Technical Digest Series Volume 9, Apr. 8–9, 1991, the contents of which are hereby incorporated by reference.

To better understand the positioning necessary for proper alignment, FIGS. 3A and 3B illustrate exemplary end views of the two-row lens array 210 and one-row LED array 200, viewed from perspective A—A as shown in FIG. 2.

FIG. 3A shows an end view of lens array 210 properly aligned with LED array 200. As shown in FIG. 3A, LED array 200 is symmetrically arranged with respect to lens array 210; that is, LED array 200 is positioned halfway between center axes of the lenses in one row and center axes of the lenses in the other row. In this way, the irradiance of the light output from one lens row matches the irradiance output from the other lens row. When combined, the light from these lens rows forms an image without a disproportionate amount of irradiance from either lens row.

If LED array 200 is asymmetrically arranged with respect to lens array 210, arrays 200 and 210 are misaligned. For example, as shown in FIG. 3B, LED array 200 is positioned directly above a center axes of the right lens row. Under this arrangement, the LED row is biased toward the right lens row. This results in non-uniformity contributions from each lens row, generating irradiance modulation at a spatial frequency of approximately one cycle/mm, which is noticeable as undesirable bands to the human eye. To compound this problem, this arrangement results in a high amplitude of irradiance modulation, causing the bands to be even more noticeable. Thus, it is desirable to maintain proper alignment of the lens array with the LED array.

In contrast to the one-row LED array 200 shown in FIGS. 2–3, multiple-row LED arrays can enhance resolution in imaging systems. For example, a two-row LED array can comprise two rows of LEDs, each comprising a 21 μm by 21 μm square. Within each row, the LEDs are spaced at 42 μm centers (e.g., the centers of adjacent LEDs are 42 μm apart).

Also, the LED rows are positioned so that the LEDs of one row are staggered with respect to the LEDs of the other row. With appropriate buffering, the images formed by the LED rows can be combined to form scan lines having a resolution of 1200 spi (spots-per-inch).

However, conventional two-row lens arrays, like the one shown in prior art FIG. 1, cannot be properly aligned with multiple-row LED arrays to avoid banding in images. Such an LED array requires that both lens rows be symmetrical with respect to the first LED row as well as the second LED row. Such an arrangement, however, is not possible with a conventional two-row lens array. Thus, it is desirable to provide a lens array that can be properly aligned with a multiple-row LED array such that banding is avoided in images produced by the lens array and LED array.

SUMMARY OF INVENTION

Accordingly, the present invention is directed to a lens array that substantially obviates one or more of the problems due to limitations and disadvantages of the related art.

One advantage of the invention is that multiple-row image bars can be used to produce images with a reduced magnitude of irradiance modulation.

Another advantage of the invention is that multiple-row image bars can be used to produce images free from spatial frequency modulation of one cycle/mm.

Still another advantage of the invention is that lens arrays can be used to image light from multiple-row image bars with a reduced magnitude of irradiance modulation.

Yet another advantage of the invention, is that lens arrays can be used to image light from multiple-row image bars free from spatial frequency modulation of one cycle/mm.

To achieve these and other advantages and in accordance with the purpose of the invention, as embodied and broadly described, the invention includes an optical system comprising an LED array including a plurality of LEDs arranged along a plurality of substantially parallel rows, and a lens array for imaging light from the LED array, the lens array including a plurality of lenses arranged along a plurality of substantially parallel rows in a direction orthogonal to center axes of the lenses. The lenses in each lens row image light emitted from LEDs in LED rows located within a field of view of the lens row, and each LED row is symmetrically arranged with respect to lens rows having fields of view encompassing the LED row.

In a further aspect, the invention includes a lens array comprising a plurality of gradient index lenses arranged along a plurality of substantially parallel rows in a direction orthogonal to center axes of the lenses. The lens rows are grouped into a plurality of sets of lens rows. An object located above and symmetrically arranged with respect to each set of lens rows is within the fields of view of the lens rows in the set, and beyond the fields of view of the lens rows not in the set.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention and are incorporated in and constitute a part of this specification, illustrate several embodiments of the invention, and, together with the description, serve to explain the principles of the invention.

In the drawings.

DETAILED DESCRIPTION

Figure 1:
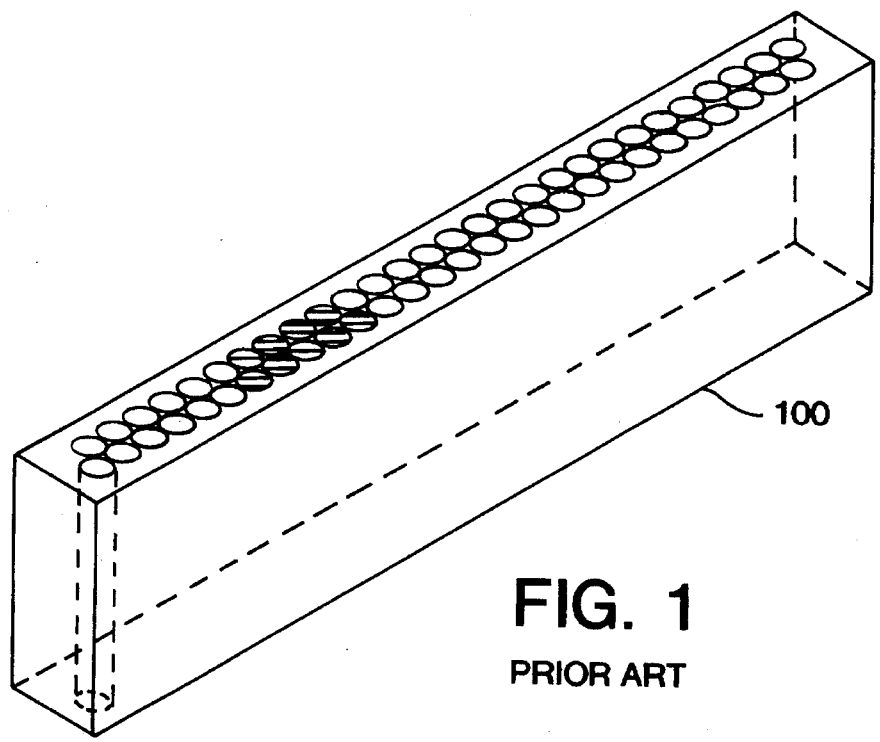
FIG. 1 is a perspective view illustrating a prior art two-row lens array.
Figure 2:
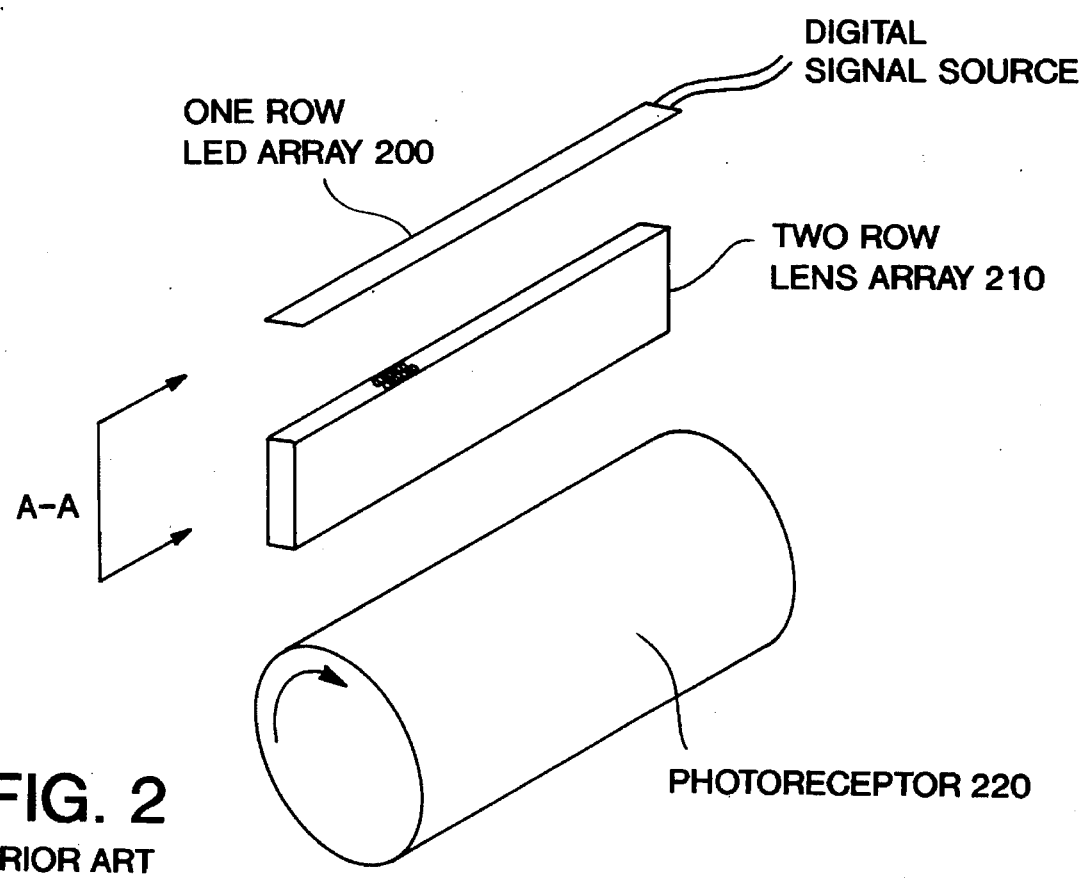
FIG. 2 is an exploded perspective view illustrating a prior art imaging system employing a single-row LED array and a two-row lens array.
Figure 3A:
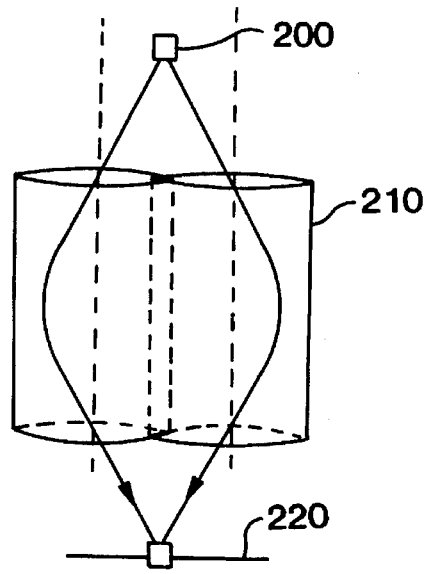
FIG. 3A is a schematic end view illustrating a two-row lens array properly aligned with a one-row LED array.
Figure 3B:
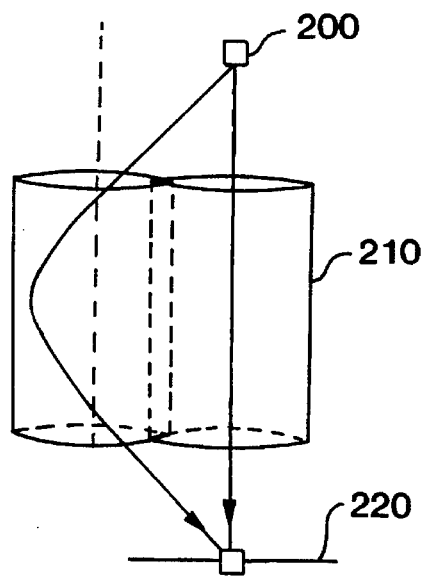
FIG. 3B is a schematic end view illustrating a two-row lens array misaligned with a one-row LED array.

In accordance with the invention, a multiple-row lens array and a multiple-row image bar are aligned with each other such that each pixel row in the multiple-row image bar is symmetrically arranged with respect to lens rows having fields of view encompassing the pixel row. In this way, images produced by the lens array and image bar do not contain irradiance modulation of one cycle/mm and also have a decreased overall magnitude of irradiance modulation.

Reference will now be made in detail to the present preferred embodiments of the invention, which are illustrated in the accompanying drawings in which like reference characters refer to corresponding elements.

Figure 4:
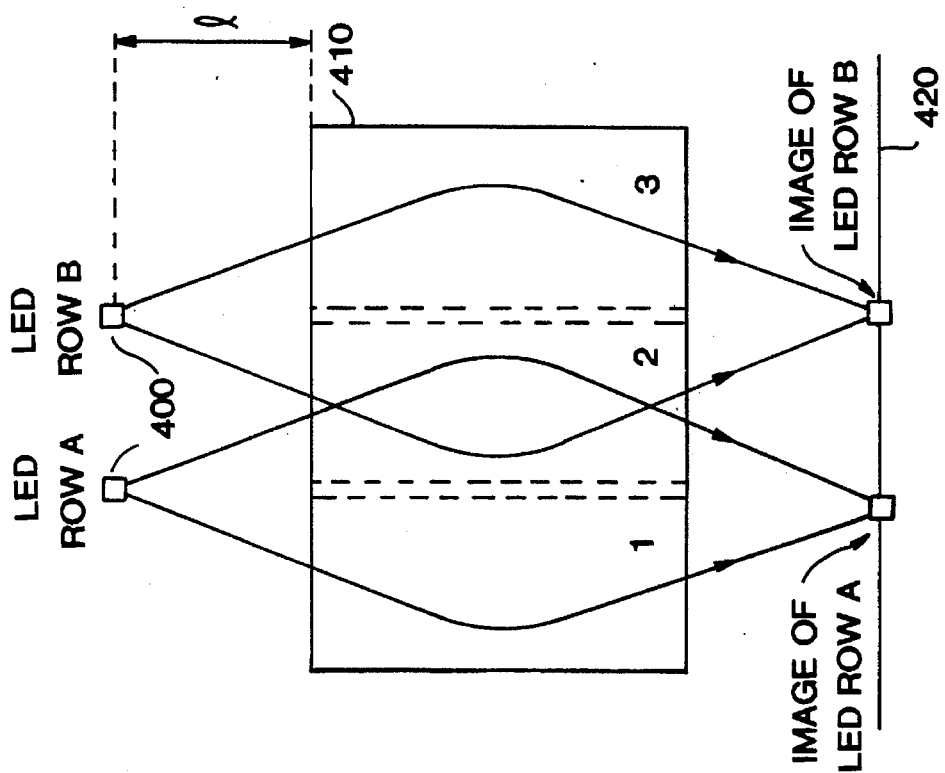
FIG. 4 is a schematic end view of an optical system in accordance with a first embodiment of the invention.

As shown in FIG. 4, the optical system of a first embodiment includes two-row LED array 400, three-row lens array 410, and photoreceptor surface 420. The lens array 410 is positioned between LED array 400 and photoreceptor surface 420.

LED array 400 preferably contains LEDs selectively activated to correspond to scan lines of an image. In the first embodiment, the LED array 400 comprises two parallel rows of LEDs, labelled in FIG. 4 as LED row A and LED row B, respectively. The LEDs contained in the LED array 400 can comprise, for example, 21 μm by 21 μm squares, spaced at 42 μm centers (e.g., the centers of adjacent LEDs are 42 μm apart). Preferably, the LEDs in row A are staggered with respect to the LEDs in row B so that, with appropriate buffering, the images formed by the LED rows can be combined to form scan lines having a resolution of 1200 spi. Of course, the LEDs can be larger or smaller, so long as the LED array can perform the functions described herein.

In an alternative embodiment, the LED array 400 could be replaced with a different type of image bar (not shown) having a plurality of pixels. For example, a liquid crystal array (not shown) having a plurality of back-lit shutters could be provided. Like the LEDs, the shutters could be selectively activated to provide light corresponding to scan lines of an image.

The lens array 410 preferably images light received from the LEDs in LED array 400 to form corresponding images on photoreceptor surface 420. The photoreceptor surface 420 can be any light sensitive surface, such as conventional photoreceptors used, for example, in laser printers or copiers. As shown in FIG. 4, the images of LED rows A and B are formed directly below their respective rows and are labelled as "Image of LED Row A" and "Image of LED Row B," respectively.

LED array 400 is preferably positioned at a distance l from lens array 410, such that the images of LED rows A and B on photodetector surface 420 are focused. The distance l depends upon certain characteristics of the gradient index lenses in lens array 410. Specifically, the distance l can be calculated as follows:

$$l = -\tan((\sqrt{A})L/2)/n_o \sqrt{A} \qquad (1)$$

where $\sqrt{A}$ is a positive gradient constant of the gradient index lenses, L is the length of the lenses, and $n_o$ is the axial refractive index. Accordingly, when the values for $\sqrt{A}$, L, and $n_o$ are known, the distance l can be calculated by applying these values to the equation (1).

In the first embodiment, lens array 410 comprises a plurality of like gradient index lenses arranged in three parallel rows, labelled 1 through 3, respectively. The gradient index lenses may be light conducting and imaging fibers or rods having indexes of refraction varying parabolically from the center axes of the fibers or rods. The lenses are preferably close packed in the lens array 410, providing little or no space between the lenses.

As shown in FIG. 4, LED row A is arranged symmetrically with respect to lens rows 1 and 2, while LED row B is arranged symmetrically with respect to lens row 2 and 3. In accordance with the invention, LED row A is within the field of view of lens rows 1 and 2, but beyond the field of view of lens row 3. Also, LED row B is within the field of view of lens rows 2 and 3, but beyond the field of view of lens row 1.

Figure 5:
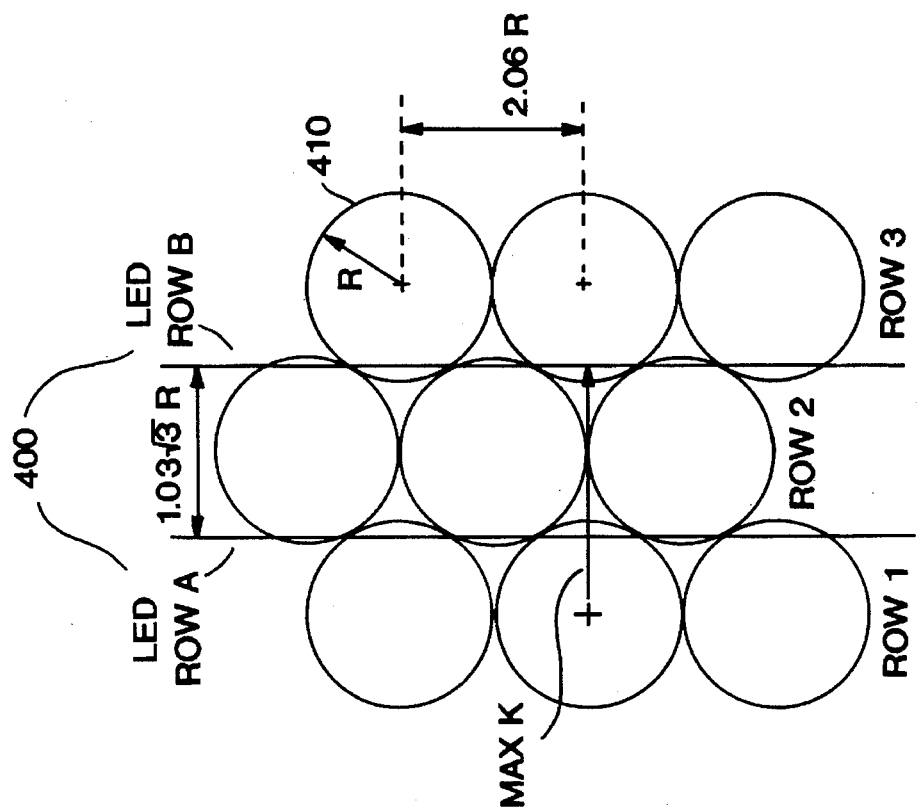
FIG. 5 is a schematic top view showing the top of the optical system shown in FIG. 4 in accordance with the first embodiment of the invention.

As shown in FIG. 5, in the first embodiment of the invention, the radius of each of the lenses is represented by R and the distance between the center axes of any two adjacent lenses is (2.06)R, representing the sum of the radii of the two lenses and a small gap between the lenses. Of course, in other embodiments, this spacing may be different.

As described above, LED rows A and B are arranged symmetrically with respect to lens rows 1 and 2, and lens rows 2 and 3, respectively. Accordingly, the distance between LED rows A and B can be calculated to be $1.03(\sqrt{3})R$. Preferably, this distance is an integer number of LEDs apart, so that, when combined, the images from these LED rows can be matched up to form scan lines.

As discussed above, LED row A is within the fields of view of lens rows 1 and 2, but not row 3; while LED row B is within the field of view of lens rows 2 and 3, but not row 1. Accordingly, row 2 images both LED rows A and B, while lens row 1 only images light from LED row A and lens row 3 only images light from LED row B. In this way, lens array 410 avoids producing images having objectionable 1 cycle/mm spatial frequency modulation, while also minimizing the overall amount of modulation frequency in the images.

The lenses are preferably designed to obtain these desired fields of views. In accordance with the invention, at a distance l, each lens has a maximum radial field of view orthogonally measured from a center axis, represented as k. That is, the lens has a field of view encompassing objects at a distance l from the lens and within a distance k orthogonal from the center axis of the lens.

As shown in FIG. 5, the maximum value of k permissible to obtain the desired fields of view is shown as a distance measured from the center axis of a lens in lens row 1 to LED row B, which is also the distance from the center axis of a lens in lens row 3 to LED row A. Values of k less than the maximum value ensure that the lenses in rows 1 and 3 do not image light from LEDs in LED rows B and A, respectively. In the system shown in FIG. 5, the maximum value of k for the lenses to achieve the desired fields of view is shown to be one and a half times a distance between lines connecting the centers of the lenses of the respective rows and can be represented as follows:

$$k < (1.5)1.03(\sqrt{3})R \approx 2.676 R \quad (2)$$

The value k for the lenses depends upon several lens characteristics and can be calculated as follows:

$$k = -R \sec((\sqrt{A})L/2) \quad (3)$$

where R is the radius of the lens, $\sqrt{A}$ is a positive gradient constant of the gradient index lenses, and L is the length of the lens. It can be seen from equation (3) that, among other things, k depends upon the length of the lenses. Thus, for a given value of k below the maximum value, the length of the lenses, L, can be calculated from equation (3), given R and $\sqrt{A}$.

In the optical system illustrated in FIGS. 4 and 5, the value of k for the lenses can be set to any value less than the maximum value of 2.676 R, for example, 2.5 R. Based upon this value of k, commercially available lens arrays can be modified in accordance with the above equations to achieve the desired characteristics. For example, one commercially available lens array, NSG SLA 12A SELFOC lens array, contains lenses having radius R of 0.5425 mm and gradient constant $\sqrt{A}$ at 660 nm of 0.2326 mm$^{-1}$. Using these values for R and $\sqrt{A}$ in equation (3), the length L of the lenses can be calculated to be 17.04 mm for k equal to 2.5 R.

Using a different commercially available lens array, NSG SLA 20A SELFOC lens array, containing lenses having lenses with a radius R of 0.5575 and gradient constant $\sqrt{A}$ at 660 nm of 0.4406 mm$^{-1}$, the length L can be calculated from equation (3) to be 9.0 mm for k equal to 2.5 R.

The images of LED rows A and B contain nearly uniform irradiance contributions from lens rows 1 and 2, and lens row 2 and 3, respectively. In addition, these images do not contain irradiance modulation of one cycle/mm, which is readily discernible to the human eye.

Additional embodiments of the invention will now be described where like or similar parts are identified throughout the drawings by the same reference numeral.

Figure 7:
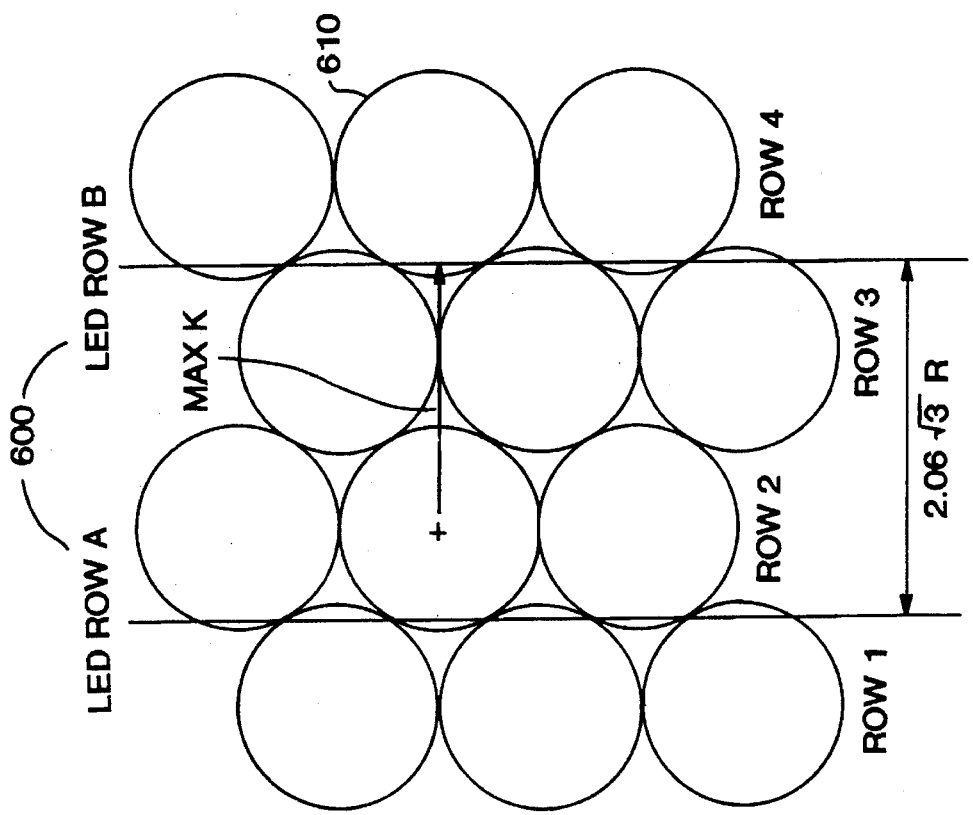
FIG. 7 is a schematic top view of the optical system shown in FIG. 6 in accordance with the second embodiment of the invention.
Figure 6:
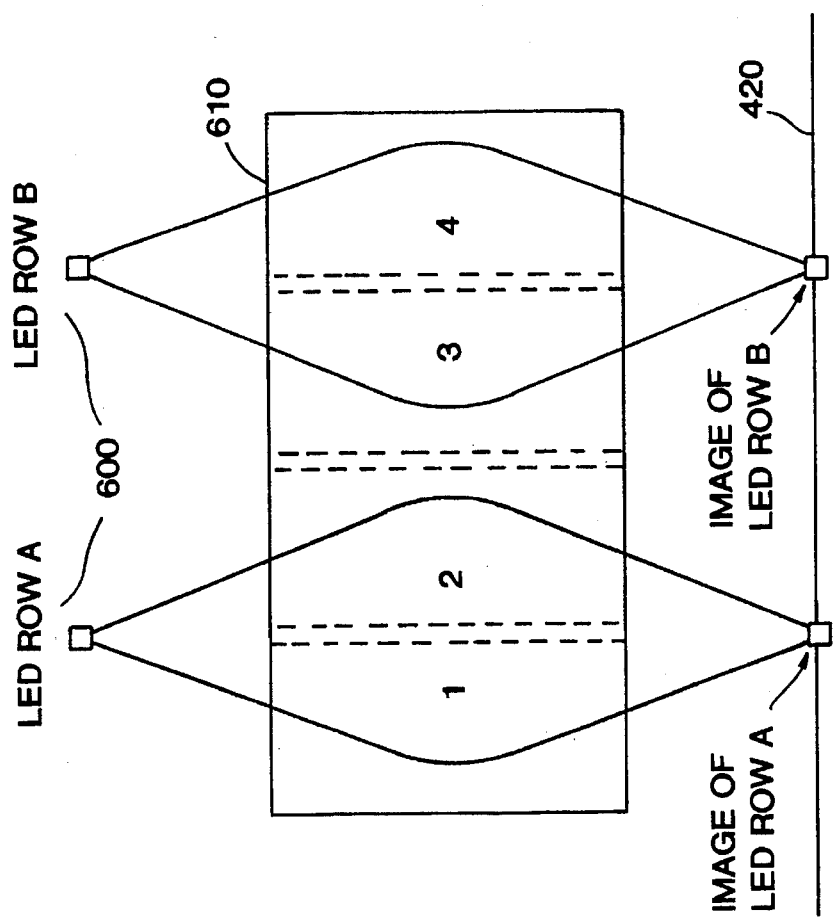
FIG. 6 is a schematic end view of an optical system in accordance with a second embodiment of the invention.

FIGS. 6 and 7 illustrate an end view and a top view of an optical system, respectively, in accordance with a second embodiment of the invention. This optical system includes a two-row LED array 600, a four-row lens array 610, and photoreceptor surface 420. Light from LED array 600 is imaged by lens array 610 onto photoreceptor surface 420.

LED array 600 and lens array 610 are preferably similar to LED 400 and lens array 410, with several differences. Specifically, while LED array 600 contains a plurality of LEDs arranged in two parallel rows like LED array 400, LED rows A and B in LED array 600 are spaced at a distance of $2.06(\sqrt{3})R$, rather than $1.03(\sqrt{3})R$, so that LED array 600 is properly aligned with the four lens array 610. Again, LED rows A and B are preferably spaced an integer number of LEDs apart, so that their images can be matched up to form scan lines.

Further, lens array 610 contains a plurality of gradient index lenses close packed and arranged in four parallel rows, labelled rows 1 through 4, respectively. As shown in FIG. 6, LED row A is arranged symmetrically with respect to lens rows 1 and 2, while LED row B is arranged symmetrically with respect to lens rows 3 and 4. Preferably, lens rows 1 and 2 only image light from LED row A, while lens rows 3 and 4 only image light from LED row B, thus producing images of LED rows A and B on the photoreceptor surface 420. Thus, the fields of view of lens rows 1 and 2 encompass LED row A, but not LED row B. Also, the fields of view of lens rows 3 and 4 encompass LED row B, but not LED row A.

These desired fields of view can be achieved by first determining the maximum value k for the lenses. As shown in FIG. 7, this maximum value of k can be measured from the center axis of a lens in row 2 to the LED row B. In this embodiment, the maximum value of k is $(1.5)1.03(\sqrt{3})R$, which is the same maximum value obtained for the lenses of the optical system of the first embodiment. Setting k to a value less than the maximum value, the length of the lenses in lens rows having the desired fields of view can be determined, given R and $\sqrt{A}$, using equation (3), as described above in connection the first embodiment.

The optical systems of the first and second embodiments both use two lens rows to image light from each LED row. Two additional embodiments will now be described that use four lens rows to image light from each LED row.

Figure 8:
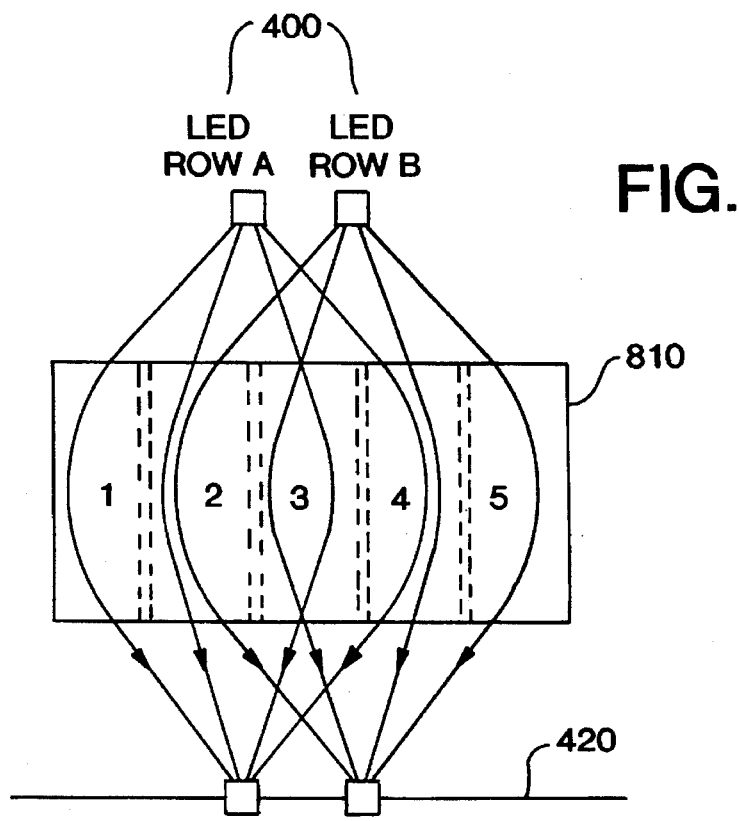
FIG. 8 is a schematic end view of an optical system in accordance with a third embodiment of the invention.
Figure 9:
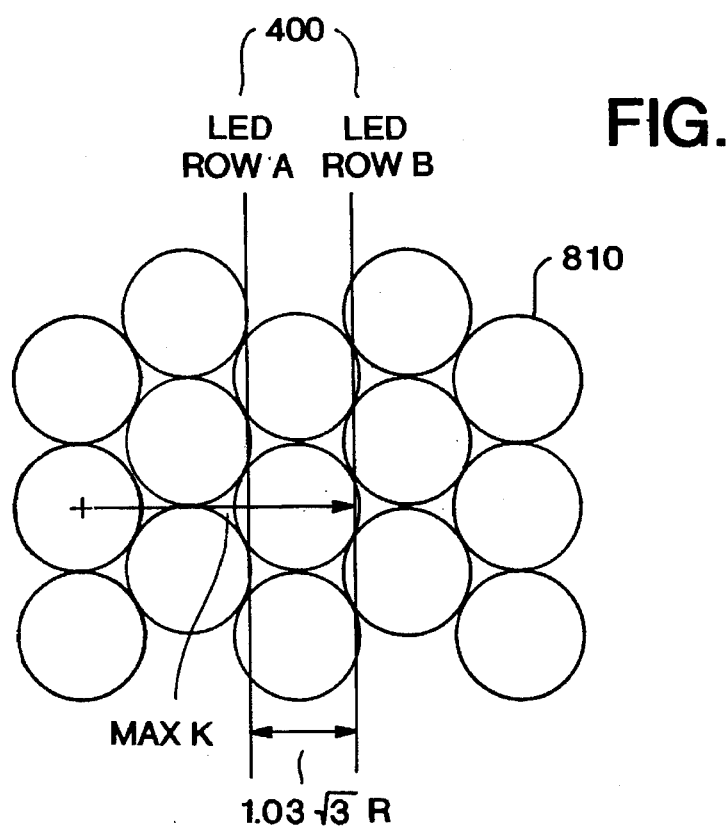
FIG. 9 is a schematic top view of the optical system shown in FIG. 8 in accordance with the third embodiment of the invention.

In a third embodiment of the invention, shown in FIGS. 8 and 9, the optical system includes two-row LED array 400, five-row lens array 810, and photoreceptor surface 420. Lens array 810 images light from LED array 400 onto photoreceptor surface 420.

Lens array 810 contains a plurality of gradient index lenses close packed and arranged along five parallel rows, labelled rows 1 through 5, respectively. LED row A is arranged symmetrically with respect to lens rows 2 and 3, while LED row B is arranged symmetrically with respect to lens rows 3 and 4. In this embodiment, lens rows 1–4 image light from LED row A, and lens rows 2–5 image light from LED row B. Thus, the fields of view of lens rows 2–4 encompass both LED rows A and B. However, the field of view of lens row 1 only encompasses LED row A, and not LED row B. Also, the field of view of lens row 5 only encompasses LED row B, and not LED row A.

As shown in FIG. 9, the maximum value of k permissible to achieve the desired fields of view can be measured from a center axis of a lens in lens row 1 to LED row B, which is $(2.5)1.03(\sqrt{3})R$. As described above in connection with the first and second embodiments, a value less than the maximum value is selected for k. Given R and $\sqrt{A}$, the desired fields of view are then obtained by determining the appropriate lengths of the lenses, in accordance with the selected value for k and equation (3).

Figure 10:
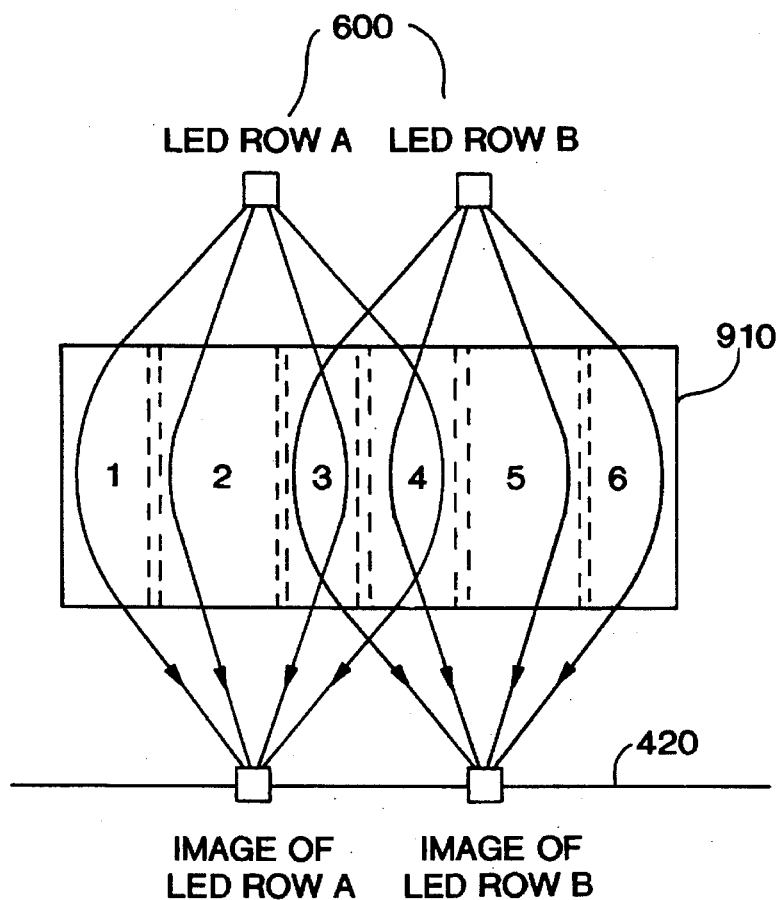
FIG. 10 is a schematic end view of an optical system in accordance with a fourth embodiment of the invention.
Figure 11:
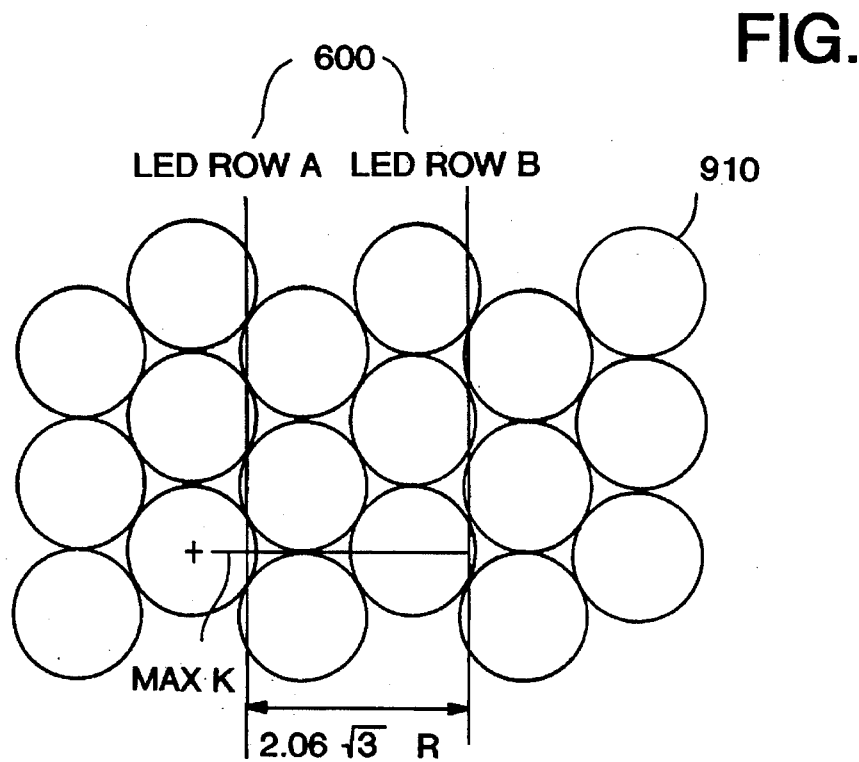
FIG. 11 is a schematic top view of the optical system shown in FIG. 10 in accordance with the fourth embodiment of the invention.

FIGS. 10 and 11 illustrate an optical system of a fourth embodiment of the invention. The optical system in this embodiment comprises two-row LED array 600, lens array 910, and photoreceptor surface 420. Lens array 910 images light from LED array 600 onto photoreceptor surface 420.

Lens array 910 comprises a plurality of gradient index lenses close packed and arranged in six parallel rows, labelled rows 1 through 6, respectively. LED row A is arranged symmetrically with respect to lens rows 2 and 3, while LED row B is arranged symmetrically with respect to lens rows 4 and 5. In this embodiment, lens rows 1–4 image light from LED row A, and lens rows 3–6 image light from LED row B. Thus, the fields of view of rows 3 and 4 encompass both LED rows A and B. However, the fields of view of lens rows 1 and 2 only encompass LED row A, and not LED row B. Likewise, the fields of view of lens row 5 and 6 encompass LED row B, but not LED row A.

As shown in FIG. 11, like the third embodiment, the maximum value of k permissible to achieve the desired fields of view is $(2.5)1.03(\sqrt{3})R$. As described above in connection with the other embodiments, a value less than the maximum value is selected for k. Given R and $\sqrt{A}$, the desired fields of view are then obtained by determining the appropriate lengths of the lenses, in accordance with the selected value for k and equation (3).

Depending on design considerations, one embodiment may be more desirable than the others in certain circumstances. For example, the optical system of the first embodiment is more compact and lower cost than those of the other embodiments because it has a lens array containing the fewest number of lens rows. If radiometric speed is desirable, the optical systems of the third and fourth embodiments are preferable because they use four lens rows to image light from each LED row rather than two.

It will be apparent to those skilled in the art that various modifications and variations can be made in the lens arrays of the present invention without departing from the spirit or scope of the invention. For example, additional LED rows and additional lens rows could be provided in the LED array and lens array, respectively, to provide greater resolution or decreased irradiance modulation in the images.

Further, although the above-described embodiments of the invention refer to LED arrays comprising a plurality of LEDs, any conventional image bar comprising a plurality of pixels could be used. For example, a different type of self-illuminating light source could be used in place of the LEDs. Alternatively, a liquid crystal array comprising a plurality of back-lit shutters could be provided instead of the LED array to provide light to be imaged by the lens array.

Thus, it is intended that the present invention cover the modifications and variations of this invention provided they come within the scope of the appended claims and their equivalents.

We claim:

1. An optical system comprising:

an image bar including a plurality of pixels arranged along a plurality of substantially parallel rows; and a lens array for imaging light from the image bar, the lens array including a plurality of lenses arranged along a plurality of substantially parallel rows in a direction orthogonal to center axes of the lenses, wherein the lenses in each lens row images light emitted from the pixels in pixel rows located within a field of view of the lens row, each pixel row being symmetrically arranged with respect to lens rows having fields of view encompassing the pixel row, wherein the image bar includes at least two rows of pixels and the lens array comprises at least five rows of lenses, and wherein a first pixel row is within the fields of view of first, second, third, and fourth lens rows and beyond the field of view of a fifth lens row, and wherein a second pixel row is within the fields of view of the second, third, fourth, and fifth lens rows and beyond the field of view of the first lens row.

2. An optical system comprising:

an image bar including a plurality of pixels arranged along a plurality of substantially parallel rows; and a lens array for imaging light from the image bar, the lens array including a plurality of lenses arranged along a plurality of substantially parallel rows in a direction orthogonal to center axes of the lenses, wherein the lenses in each lens row images light emitted from the pixels in pixel rows located within a field of view of the lens row, each pixel row being symmetrically arranged with respect to lens rows having fields of view encompassing the pixel row, wherein the image bar includes at least two rows of pixels and the lens array comprises at least six rows of lenses, and wherein a first pixel row is within the fields of view of first, second, third, and fourth lens rows and beyond the field of view of fifth and sixth lens rows, and wherein a second pixel row is within the fields of view of the third, fourth, fifth, and sixth lens rows and beyond the field of view of the first and second lens rows.

3. A lens array comprising:

a plurality of gradient index lenses arranged along a plurality of substantially parallel rows in a direction orthogonal to center axes of the lenses, wherein an object located above and symmetrically arranged with respect to each set of lens rows is within the fields of view of the lens rows in the set, and beyond the fields of view of the lens rows not in the set, wherein the plurality of lenses are arranged along at least five rows, the lens rows being grouped into a plurality of sets of lens rows, wherein first, second, third, and fourth lens rows form a first set, and second, third, fourth, and fifth lens rows form a second set.

4. A lens array comprising:

a plurality of gradient index lenses arranged along a plurality of substantially parallel rows in a direction orthogonal to center axes of the lenses, wherein an object located above and symmetrically arranged with respect to each set of lens rows is within the fields of view of the lens rows in the set, and beyond the fields of view of the lens rows not in the set, wherein the plurality of lenses are arranged along at least six rows, the lens rows being grouped into a plurality of sets of lens rows, wherein first, second, third, and fourth lens rows form a first set, and third, fourth, fifth, and sixth lens rows form a second set.

* * * * *